(No Model.)
T. G. HUNTER.
PROCESS OF REMOVING AND RECOVERING METAL COATINGS FROM METALLIC BASES.
No. 529,862. Patented Nov. 27, 1894.
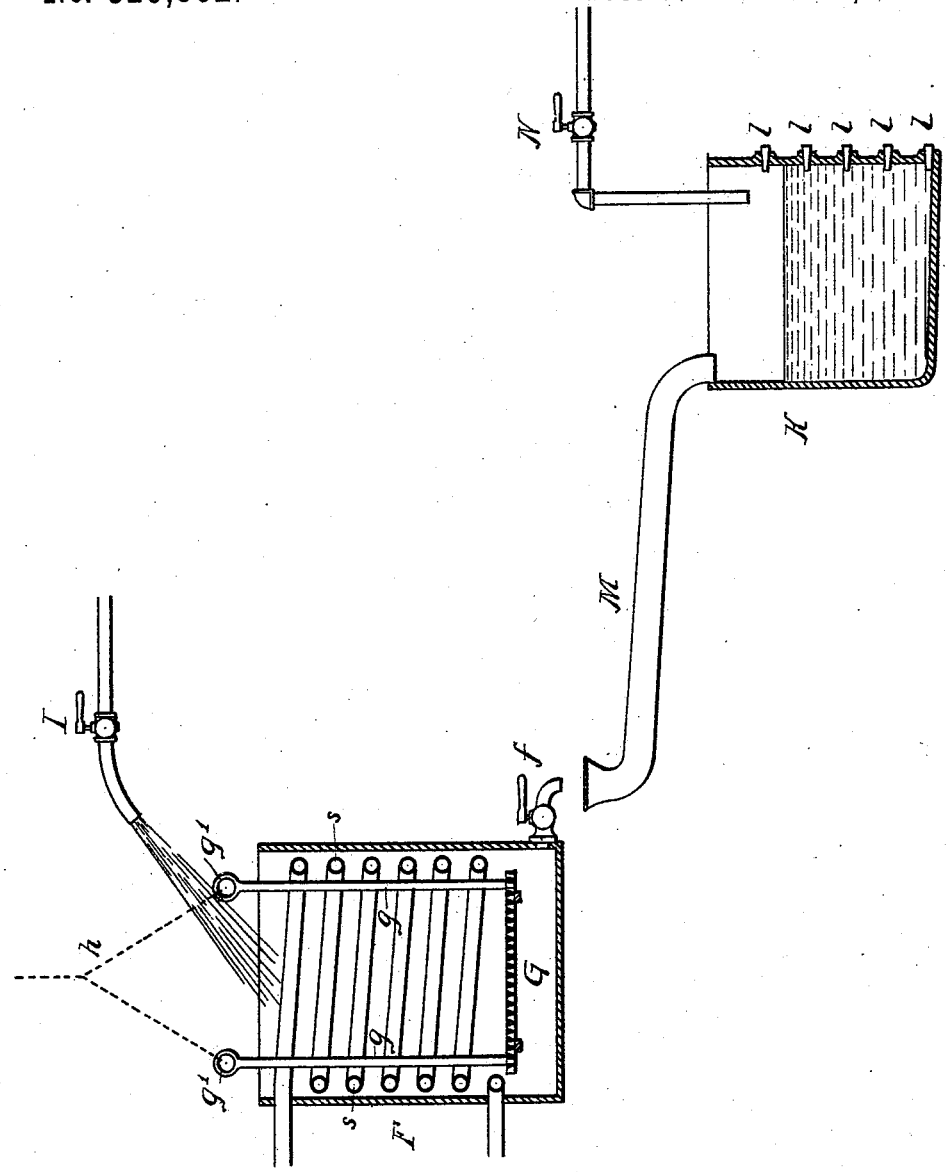

UNITED STATES PATENT OFFICE.

THOMAS G. HUNTER, OF PHILADELPHIA, PENNSYLVANIA.

PROCESS OF REMOVING AND RECOVERING METAL COATINGS FROM METALLIC BASES.

SPECIFICATION forming part of Letters Patent No. 529,862, dated November 27, 1894.

Application filed January 30, 1894. Serial No. 498,453. (No specimens.)

*To all whom it may concern:*

Be it known, that I, THOMAS G. HUNTER, of the city of Philadelphia and State of Pennsylvania, have invented a certain new and useful Process of Removing and Recovering Metal Coatings from Metallic Bases; and I do hereby declare the following to be a full, clear, and exact description thereof, reference being had to the accompanying drawing forming part of this specification.

My invention has relation to the treatment of metals consisting of a base of sheet metal and a coating of alloy or other metal for the purpose of separating the two metals and reclaiming them in their separate conditions.

In Letters Patent of the United States No. 511,846, issued to me January 2, 1894, I have described and claimed a process for removing tin from scrap, referring in the process to the employment of sulphate of copper as the active agent.

My present application pertains to the same class of invention, and has for its object the reclaiming and separating of combined metals consisting of a base of one metal and a coating of another metal, or alloy, for commercial purposes, and which can be operated upon large quantities of metal at a comparatively small cost. I am aware that while numerous processes have heretofore been invented by others, the aim of which has been to accomplish this result, most of the methods have been complicated, embodying materially different elements, while all employ materially different steps, and are commercially inoperative, if not for other reasons, because of the great expense incident to carrying out the respective processes on a large scale.

In the composition of soluble neutral compounds the metal contained or carried therein operates to exclude or occupy the place of hydrogen, as for example should sulphuric acid $H_2SO_4$ be employed, the presence of the hydrogen, would prevent the operation of the acid radical upon the metal coating of the material to be operated upon in the process hereinafter described because of the greater affinity of sulphuric acid radical for the hydrogen than for the metal coating. It is therefore necessary that the soluble neutral compound (containing the acid radical), to be employed as the active agent in my process, shall contain a metal or material which practically excludes the hydrogen, and which, at the same time, shall have less affinity for the acid radical than the coating metal of the combined metal scrap to be operated upon.

In carrying out my present invention I employ any of the neutral salts of copper included in the halogen group, or haloid compounds, chlorine, fluorine, bromine and iodine. Of these I preferably use chloride of copper.

Where the coated metal to be operated upon is what is known as "tin scrap," and the metal to be removed is tin and the base iron, when chloride of copper is used, the tin having a greater affinity for the acid radical of the chloride of copper, the copper will be at once precipitated and the acid will attack the tin until the tin is all removed and held in solution as chloride of tin, which tin in turn will be precipitated by the iron forming, with the acid radical, chloride of iron.

The following formula shows chemically the component parts of the chloride of copper, as a matter of illustration:—

$$CuCl_2 + Sn = SnCl_2 + CuSnCl_2 + Fe = FeCl_2 + Sn.$$

In the accompanying drawing I have illustrated one form of apparatus by which my invention may be carried into effect, although it will be understood that any other suitable apparatus may be employed, my invention residing in the process described.

In the drawing F represents a suitable tank, preferably of wood, having an open top and provided at its lower end with a valved discharge, *f*. At a short distance above the bottom of the tank is a basket or grate, G, having vertical side bars, *g*, terminating at a point above the top of the tank in eyes, *g'*, to which hoisting chains, *h*, may be attached to remove the grate from the tank, when necessary. The grate, G, and bars, *g*, are preferably constructed of gun metal, or metal which will not be acted upon by the acid. Above the tank is a valved pipe, I, through which water is supplied in the flushing operation hereinafter described. At a point below the tank, F, is a supply tank, K, having an upper open end, while preferably at various levels on one or more sides are taps, *l*, through which the contents of the tank may be discharged. This tank is adapted to receive the contents of the tank, F, which, when discharged, flow through the conducting pipe or trough, M, of the tank, K. At a suitable point above the tank, K, is a valved water supply-pipe, N, by which water is supplied for cleansing purposes.

In carrying out my process I subject the coating metal to be treated in the tank, F, to the action of a chloride of copper or other haloid salt of copper. The coating metal of the metal to be treated having a greater affinity for the acid radical of the said salt than the metal contained in the salt, it is attacked by the acid radical and the metal previously contained in solution, having less affinity for the acid radical, is immediately precipitated to the bottom of the tank. After a time the coating is entirely removed and held in solution, whereupon the metal comprising the base of the metal operated upon having a greater affinity for the acid radical is attacked by the acid, and the metal previously held in solution is precipitated in the metallic form. When all the metal previously forming the coating metal has been precipitated the liquor and the precipitated metals are drawn off from the tank, F, through the trough or pipe, M, to the tank, K. By subsequently flooding the tank, F, with water all the remaining particles of metal are washed to the bottom of the tank, F, when the water and remaining precipitate is drawn off, as before to the tank, K. The grate, G, which may, if desired, be provided with sides to form a cage, or basket, is then removed by the hoisting ropes or chains, *h*, and the metal forming the base removed. The precipitated metal contained in the tank, K, is removed therefrom after the liquor has been drawn off from said tank.

In the drawing I have shown steam supply pipes, *s*, surrounding the cage, or basket, in which the tin is contained, so that, if necessary, heat may be used to facilitate the operation, said pipes being composed of any metal which the solution will not attack.

I have found in carrying out my process when chloride of copper is employed upon iron coated with tin, that in the precipitate the copper forms in a spongy mass distinct from the flocculent precipitate of tin, and that, as a consequence, the precipitate of copper is very readily removed and separated by decantation, or by any other mechanical means, from the precipitate of tin. This feature renders the process additionally valuable, as the pure precipitates may be readily independently separated and remelted by methods well known in the arts as substantially pure recovered products retaining their respective original inherent qualities and consistencies.

Having thus described my invention, what I claim, and desire to secure by Letters Patent, is—

1. The process of separating coating metal from the coated article the coating metal of which is more electro positive than the base of the soluble compound to be employed in the process and the metallic base metal is more electro positive than its coating, said process consisting in subjecting the coating metal to the action of a neutral haloid salt of copper precipitating the metal originally held in solution, the coating metal taking its place in the solution, substantially as herein described.

2. The process herein described of recovering metal coating from a metallic base, wherein the metal coating to be treated is more electro positive than the base of the soluble compound to be employed and the metallic base metal is more electro positive than its coating, consisting in immersing the coated article to be treated and precipitating the metal of the neutral haloid salt of copper in which the combined metals to be treated are immersed by the greater affinity of the coating metal for the acid radical of the haloid salt of copper dissolving the coating metal and holding the same in solution, subsequently precipitating the said coating metal by the greater affinity of the metal base for the said acid radical.

3. The herein described process of removing metal coating from its base, wherein the metal coating to be treated is more electro positive than the base of the soluble compound to be employed and the metallic base is more electro positive than its coating, consisting in subjecting the coating to the action of the neutral solution of chloride of copper and permitting such action to continue until the copper and coating metal have been precipitated in metallic form.

4. The herein described process of treating "tin scrap" consisting in subjecting the tin to the action of a neutral solution of chloride of copper and permitting such action to continue until the copper and tin have been precipitated in metallic form.

5. The process of treating "tin scrap" said process consisting in subjecting the "tin scrap" to the action of a neutral solution of chloride of copper, permitting such action to continue until the copper and tin have been precipitated and chloride of iron formed, then removing the precipitate with the chloride of iron, flushing the remaining iron and finally removing said iron.

In witness whereof I have hereunto set my hand this 29th day of January, A. D. 1894.

THOMAS G. HUNTER.

Witnesses:
JNO. E. PARKER,
HORACE PETTIT.